(12) United States Patent
Matsuoka et al.

(10) Patent No.: US 7,071,953 B2
(45) Date of Patent: Jul. 4, 2006

(54) IMAGE PROCESSING METHOD AND IMAGE PROCESSING APPARATUS FOR OBTAINING OVERLAID IMAGE

(75) Inventors: Hiroto Matsuoka, Zama (JP); Hidenori Sato, Zama (JP); Hitoshi Kitazawa, Koganei (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 407 days.

(21) Appl. No.: 10/285,491

(22) Filed: Nov. 1, 2002

(65) Prior Publication Data

US 2003/0085907 A1 May 8, 2003

(30) Foreign Application Priority Data

Nov. 2, 2001 (JP) ............................... 2001-337621
May 15, 2002 (JP) ............................... 2002-139464

(51) Int. Cl.
*G09G 5/00* (2006.01)

(52) U.S. Cl. ..................... 345/629; 345/589; 345/592; 345/619; 345/625

(58) Field of Classification Search .............. 345/589, 345/592, 619–620, 625–626, 629–630, 632, 345/634
See application file for complete search history.

(56) References Cited

U.S. PATENT DOCUMENTS 5,577,179 A * 11/1996 Blank .......................... 345/639
6,377,269 B1    4/2002 Kay et al.
6,389,155 B1 *  5/2002 Funayama et al. .......... 382/118

FOREIGN PATENT DOCUMENTS

| JP | 2001-143085 | 5/2001 |
| JP | 2001-148021 | 5/2001 |
| JP | 2001-243497 | 9/2001 |

OTHER PUBLICATIONS

H. Matsuoka, et al., SIGGRAPH, 3 pages, "Regeneration of Real Objects in the Real World", Jul. 2002.
H. Matsuoka, et al., Eurographics 2002, vol. 21, No. 3, 7 pages, Representation of Pseudo Inter–Reflection and Transparency by Considering Characteristics of Human Vision, Sep. 2002.
A. R. Smith, et al., Proceedings of SIGGRAPH, '96, pp. 259–268, "Blue Screen Matting", Aug. 1996.
H. Matsuoka, et al., IEEE International Workshop on ARToolKit, 2 pages, Environment Mapping for Objects in the Real World: A Trial Using ARToolKit, Sep. 2002.

* cited by examiner

*Primary Examiner*—Matthew C. Bella
*Assistant Examiner*—Po-Wei Chen
(74) *Attorney, Agent, or Firm*—Oblon, Spivak, McClelland, Maier & Neustadt, P.C.

(57) ABSTRACT

Two images P1 and P2 having different backgrounds are input into a transparency calculation processing part AT. The transparency calculation processing part AT obtains a transparency image PT from P1 and P2. Next, noise is removed from the transparency image PT as necessary. A color calculation processing part AC generates a color image PC from P1 and P2. Next, a cutting processing part AR cuts unnecessary parts from the transparency image PT and the color image PC. Finally, an overlaying processing part AS overlays the object O on a background image PZ by using PT, PC and PZ.

38 Claims, 13 Drawing Sheets

IMAGE PROCESSING METHOD AND IMAGE PROCESSING APPARATUS FOR OBTAINING OVERLAID IMAGE

BACKGROUND OF THE INVENTION

1. Field of the Invention

The present invention relates to an image processing method and the processing apparatus for cutting out an object from an image, obtaining a transparency of the object, and overlaying the object on a two-dimensional image.

2. Description of the Related Art

The technology for overlaying an image of an object on another background image is often used in a movie, television and the like. In addition, the technology is also used for obtaining a three-dimensional image by taking images of the object from many directions. In the technology, segmentation is necessary for removing the background image from an image taken by a camera.

One of the general segmentation methods is a chroma key method. In this chroma key method, a picture is taken while the background is set to be a signal color, and an area having the same color as the background color is removed from the image. However, according to the chroma key method, unevenness of background color may appear due to environmental conditions for taking the image. In addition, when the object has a color similar to the color of the background, the object cannot be clearly cut out.

Another method for the segmentation is that a background without the object is taken first, and an image including the object is taken, then, the object is cut out by comparing the images. According to this method, there is merit in that the object can be cut out even when the background has a single color. However, like the chroma key method, the object cannot be clearly cut out when the background includes a shadow of the object, or when the object includes an area similar to the background.

In a method disclosed in Japanese laid-open patent application No.2001-148021, the above-mentioned problems are solved by using a plurality of pictures in which the background is different for each picture. However, even though this method is used; when the surface of the object is reflective so that the background image is reflected off the surface of the object, or, when the object is semi-transparent so that the background is seen through the object, there is a problem in that a part of the object may disappear. In this case, as shown in FIG. 3, when the object is overlaid on the background image, the object seems unnatural.

According to Japanese laid-open patent application No.2001-143085, a method is proposed for obtaining transparency of the object by using a background of black and white stripes. However, this method is limited to a special case where the transparency of the object is even.

As mentioned above, according to the conventional segmentation methods, there are the following problems. When the object is semi-transparent, or when the surface is reflective, a part of the image of the object is unnaturally lacking, so that the background and the object cannot be clearly separated. Thus, when the image of the object is overlaid on another image, the overlaid image becomes bad-looking.

SUMMARY OF THE INVENTION

An object of the present invention is to provide an image processing method and an apparatus for accurately extracting an object even in the above-mentioned conditions, and reproducing semi-transparency and reflection so as to obtain a natural image when the object is overlaid on another image.

The above object is achieved by an image processing method used for an image processing apparatus to overlay an image of an object on another image, the method including:

a step of receiving n images each of which includes an object, wherein n is an integer no less than two, and either or both of color and brightness are different for each of the n images;

a transparency calculation step of obtaining, from the n images, a transparency image having a transparency value for each pixel;

a color calculation step of obtaining a color image of the object from the n images; and an overlaying step of overlaying the object on the another image by using the transparency image and the color image.

In the image processing method, transparency AP (x, y) of each pixel of the transparency image may be obtained by an equation $1-|(P1(x,y)-P2(x,y))/PPMAX|$, wherein PPMAX is PPB1–PPB2, P1(x, y) is a pixel value of a first image in the n images, P2(x, y) is a pixel value of a second image in the n images, PPB1 is a pixel value of a pixel in a part other than the object in the first image, PPB2 is a pixel value of a pixel in the second image corresponding to the pixel in the first image.

In addition, in the image processing method, PPMAX may be the greatest value in absolute values of P1(x, y)–P2(x, y) for every pixel.

In addition, PPMAX may be calculated for each line in the first image and the second image. In this case PPMAX may be calculated as PE1–PE2, wherein PE1 is a pixel value of a pixel of an edge of each line in the first image and PE2 is a pixel value of an edge in the second image corresponding to a pixel of the edge in the first image.

In the image processing method, transparency AP (x, y) of each pixel of the transparency image can be obtained by an equation $1-|(P1(x,y)-P2(x,y))/(PB1(x,y)-PB2(x,y))|$, wherein P1(x, y) is a pixel value of a first image in the n images, P2(x, y) is a pixel value of a second image in the n images, PB1(x, y) is a pixel value of a pixel (x, y) in a first background image that does not include the object and the background of the first background image is the same as the background of the first image, PB2(x, y) is a pixel value of a pixel (x, y) in a second background image that does not include the object and the background of the second background image is the same as the background of the second image.

In the image processing method, wherein the first image and the second image may be a combination selected from the n images, the transparency AP(x, y) is calculated as a mean value of transparencies for every combination in the n images.

In addition, the color image may be one of the n images. Or, each pixel value of the color image may be a mean value of pixel values of pixels in the same position in the n images.

In the image processing method, influence of color of the background can be removed from the color image by using the transparency image.

In the image processing method, a first rectangular image enclosing the object is cut out from the transparency image, and a second rectangular image enclosing the object is cut out from the color image. In this case, the first rectangular image includes pixels each of which has a transparency greater than a threshold, and the size and the position of the second rectangular image are the same as the size and the position of the first rectangular image.

The image processing method may further includes a noise removing step of applying a noise removing filter on the transparency image.

In the image processing method, a pixel value PS(x,y) of the overlaid image can be obtained by PS(x,y)=PC(x,y)×PT(x,y)+PZ(x,y)×(1−PT(x,y)), wherein PT(x, y) is a pixel value of the transparency image, PC(x, y) is a pixel value of the color image, and PZ(x, y) is a pixel value of the another image.

In addition, a pixel value of the overlaid image can be obtained by $$PS(x, y) = PC(x, y) \times PT(x, y) + (1 - PT(x, y)) \times \frac{1}{(k+1)^2} \sum_{m=-\frac{k}{2}}^{m=\frac{k}{2}} \sum_{n=-\frac{k}{2}}^{n=\frac{k}{2}} PZ(x+m, y+n)$$

and k=K×PT(x,y), wherein PT(x, y) is a pixel value of the transparency image, PC(x, y) is a pixel value of the color image, and PZ(x, y) is a pixel value of the another image. In this case, the overlaid image is obtained after the another image is filtered by a filter by which blurring amount is changed according to a pixel value of the transparency image, and the filter is a moving average filter or a median filter in which the size of the matrix is changed according to a pixel value of the transparency image.

In the image processing method, the object can be overlaid on the another image by using an object color image, instead of the color image, that is taken separately from the n images. In this case, the object color image may be an image selected from object color images each of which is taken under a different lighting condition, and a lighting condition for the object color image that is selected is the closest to a lighting condition under which the another image is taken.

In addition, according to the present invention, an image forming apparatus that generates an overlaid image according to the image processing method of the present invention is provided. Further, a computer readable medium storing a program for causing a computer to generate an overlaid image according to the image processing method of the present invention is provided, and the program is provided.

According to the present invention, n images P1–Pn are received, wherein n is an integer no less than two, and either or both of color and brightness of the background are different for each of the n images. Then, transparency information is obtained by using the difference of color and/or brightness of the background. A reflective part in the surface of the object O can be represented by the value of transparency according to the amount of reflection. Since the transparency changes smoothly, an overlaid image having a natural boundary between a background image PZ and the object O can be obtained by overlaying the object O on the two-dimensional background image PZ.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be described in detail with reference to figures.

Figure 1:
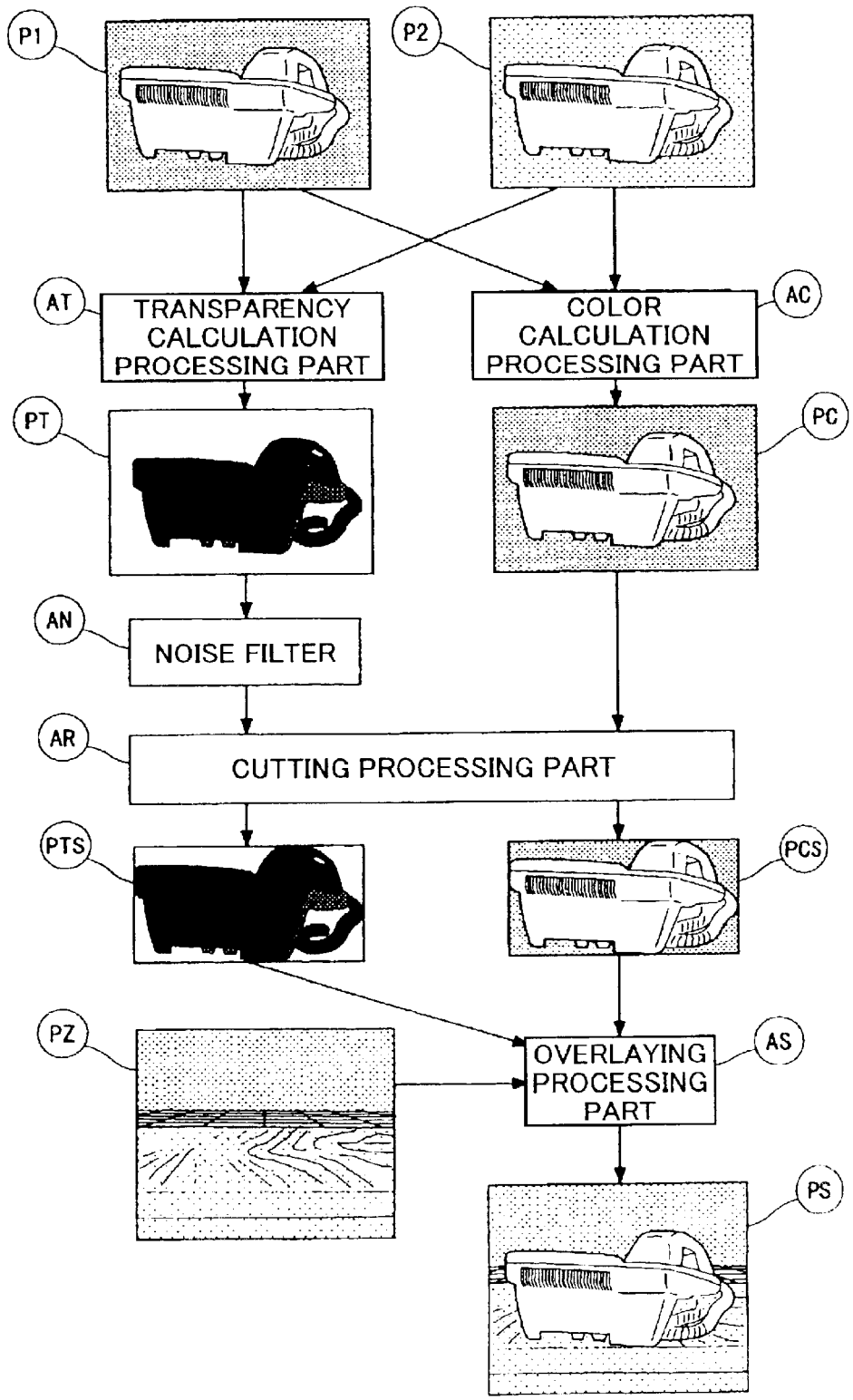
FIG. 1 shows a configuration of the image processing apparatus according to an embodiment of the present invention.

FIG. 1 shows a configuration of the image processing apparatus according to the first embodiment of the present invention. The image processing apparatus B includes a transparency calculation processing part AT, a color calculation processing part AC, a noise filter AN, a cutting processing part AR, and an overlaying processing part AS, in which the noise filter AN is optional.

Two images P1 and P2 including the object are input into the transparency calculation processing part AT, wherein the images P1 and P2 are taken by changing color and/or brightness of the background, that is, color and/or brightness of the background of the image P1 is different from that of the image P2. The transparency calculation processing part AT obtains a transparency image PT from the images P1 and P2. Then, noise is removed from the transparency image PT by using the noise filter AN as necessary. The color calculation processing part AC receives the images P1 and P2, and outputs a color image PC. The image size of each of the transparency image PT and the color image PC can be decreased by cutting unnecessary parts, that is, by cutting parts other than the part enclosing the object O by the cutting processing part AR. The overlaying processing part AS receives the cut out transparency image PT, the cut out color image PC, and a background image PZ that is separately taken, and generates an overlaid image PS in which the object O is overlaid on the background image PZ.

Figure 2:
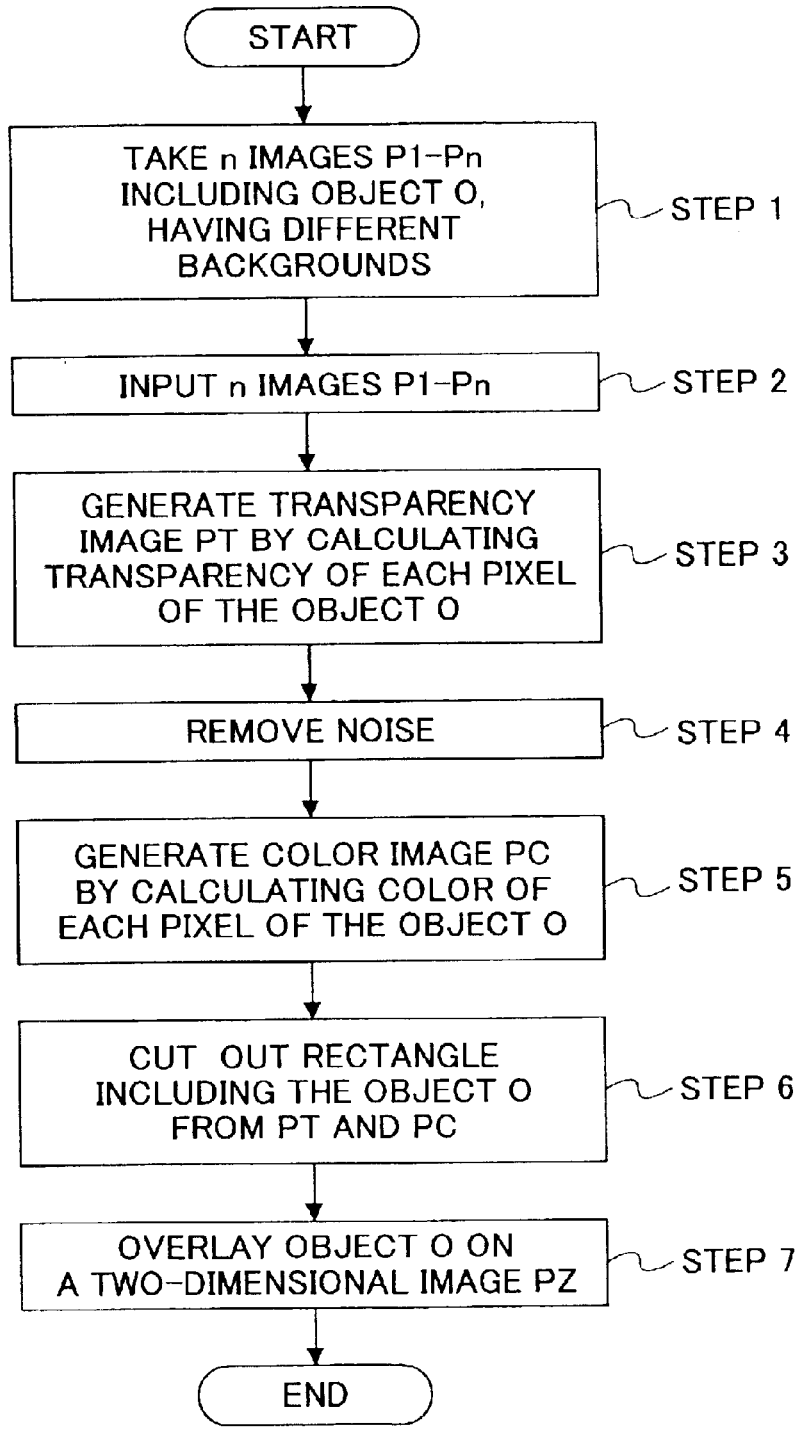
FIG. 2 shows a process flow performed by the image processing apparatus according to the embodiment of the present invention.

FIG. 2 shows a process flow performed by the image processing apparatus.

In step 1, images of the object O are taken by an after-mentioned image-capturing system SP while changing color and/or brightness of the background. Next, in step 2, the two images P1 and P2 are input into the transparency calculation processing part AT. In step 3, the transparent calculation processing part AT performs after-mentioned transparency calculation for every pixel by using the two images P1 and P2 so as to obtain the transparency image PT in which transparency of each pixel is represented by a real number from 0 to 1, wherein 0 indicates transparent, and 1 indicates opaque. Next, in step 4, noise is removed from the transparency image PT obtained by the transparent calculation processing part AT by using the noise filter AN as necessary. In step 5, the color calculation processing part AC performs color calculation for each pixel from the images P1 and P2, so that the color image PC is generated. Next, in step 6, the cutting processing part AR cuts a part other than the part enclosing the object O for each of the transparency image PT and the color image PC so as to decrease the image size. Finally, in step 7, the overlaying processing part AS receives the cut out transparency image PT, the cut out color image PC, and the background image PZ that is taken separately, and generates the overlaid image PS in which the object O is overlaid on the background image PZ. In the above-mentioned procedure, the steps 3, 4 and 5 can be performed in parallel, thus, any step can be performed first.

Figure 3:
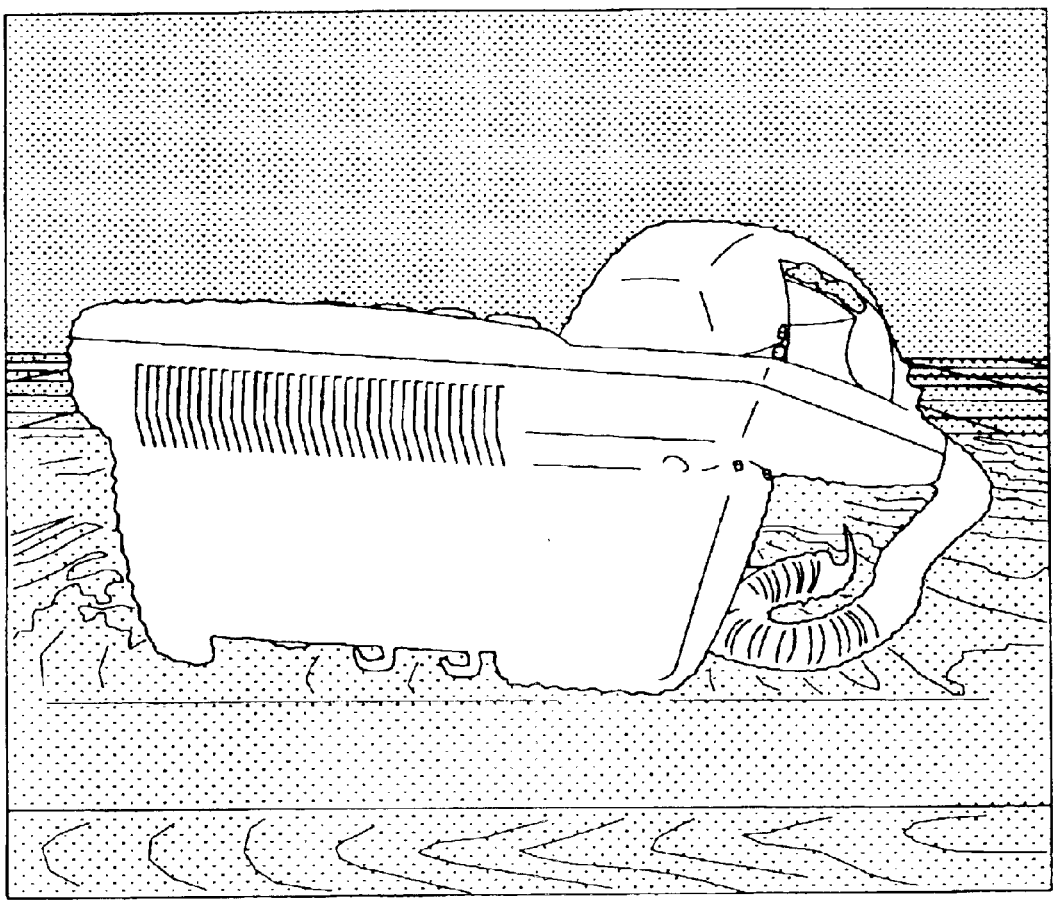
FIG. 3 shows an example image in which an object image is overlaid on a background image according to a conventional technology.
Figure 4:
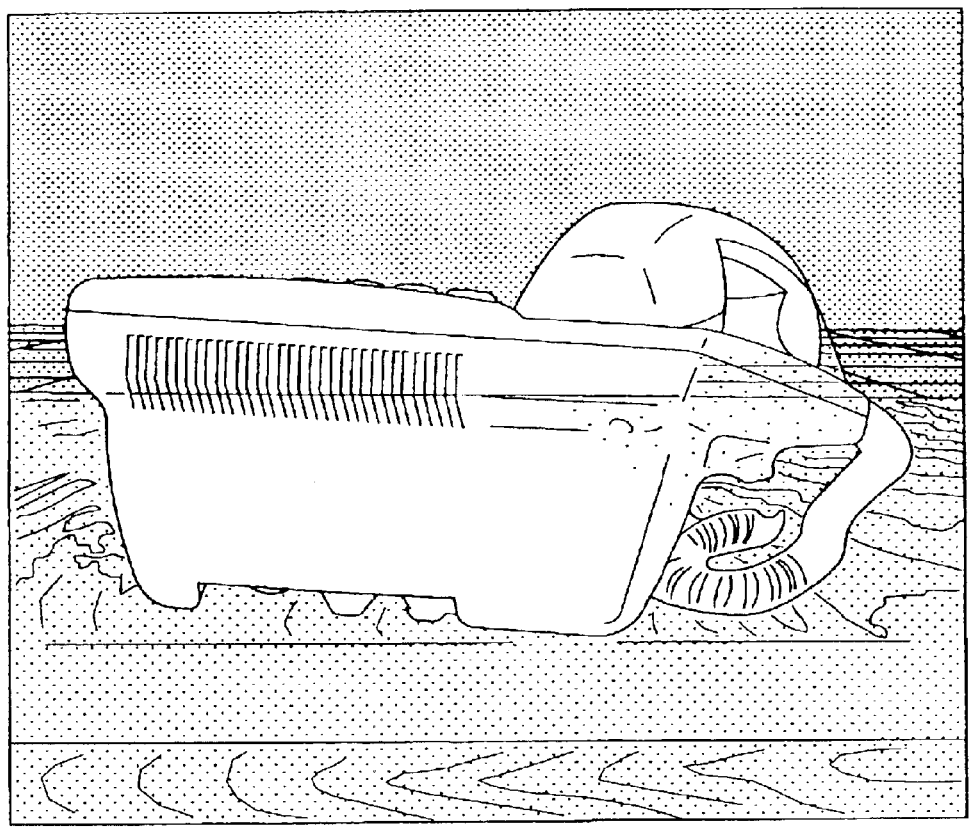
FIG. 4 shows an example image in which an object image is overlaid on a background image.
Figure 5:
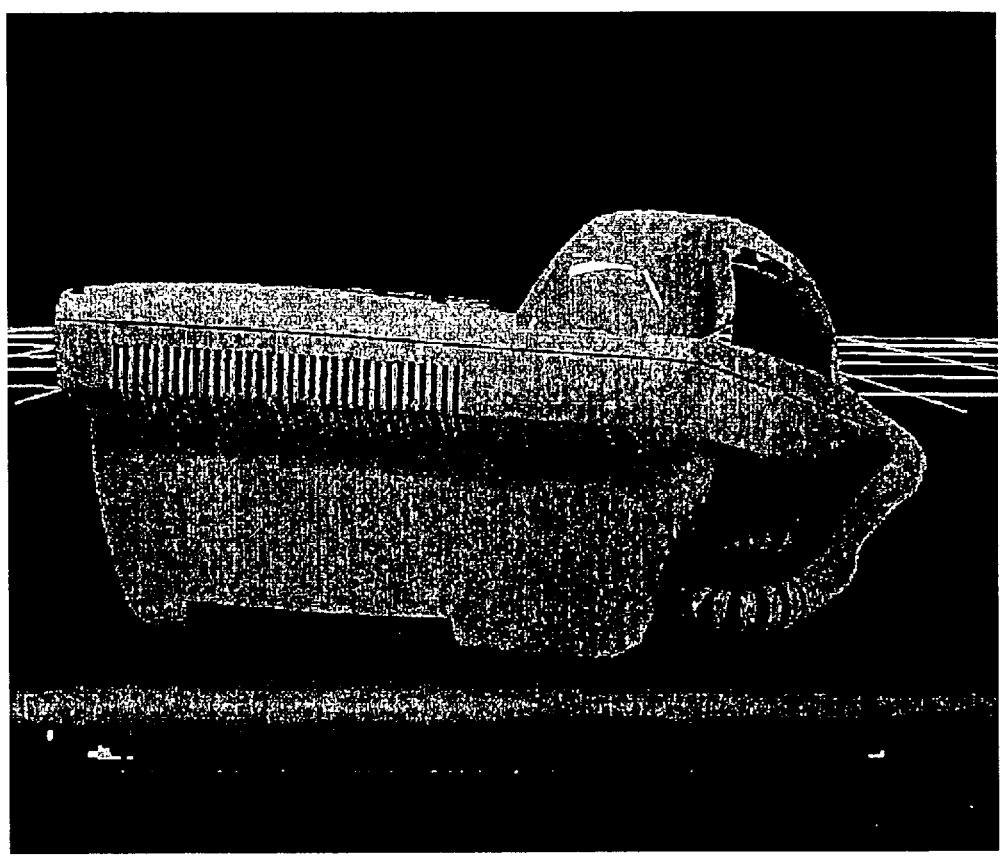
FIG. 5 is a corresponding actual image.
Figure 6:
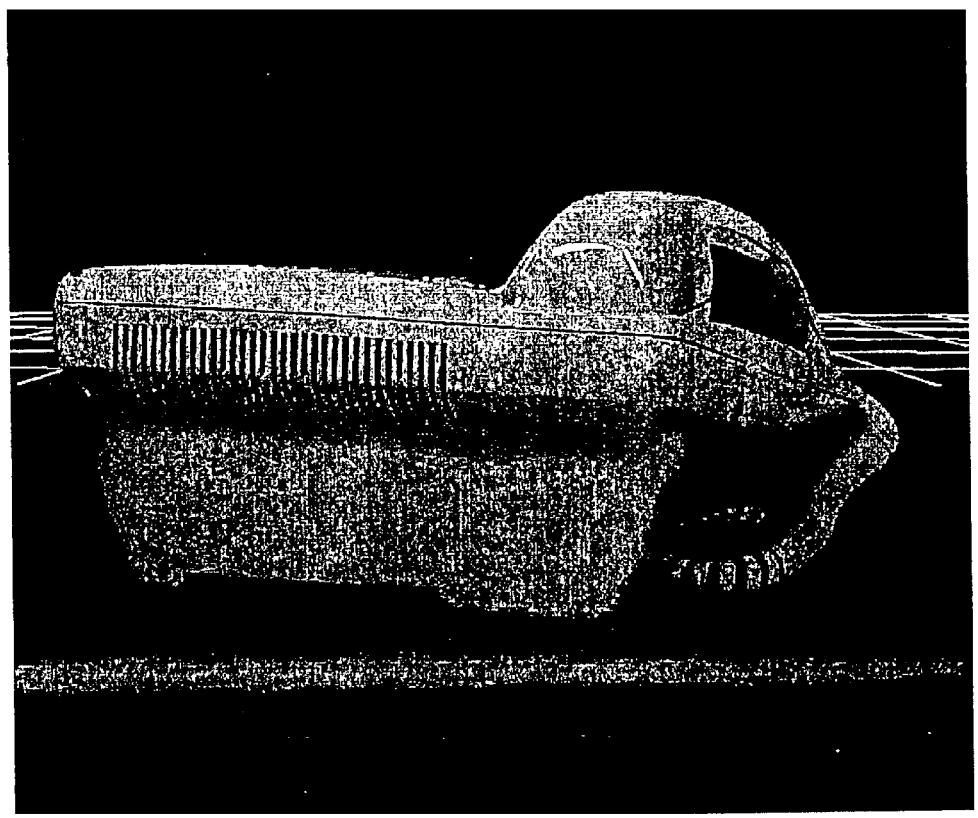
FIG. 6 is a corresponding actual image.
Figure 7:
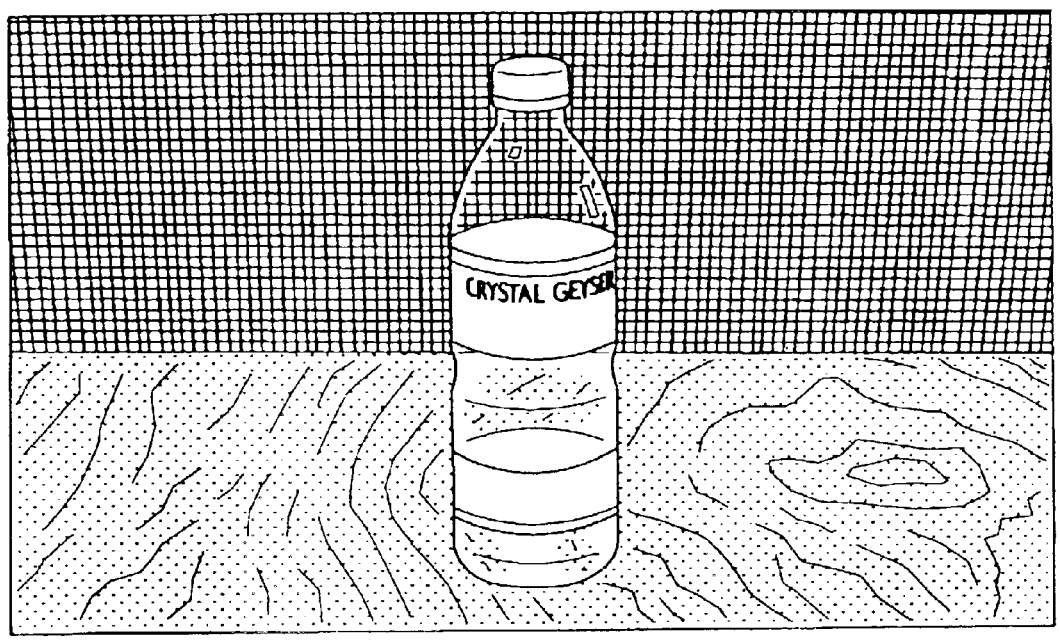
FIG. 7 shows an example image in which an image of a semi-transparent object is overlaid on a background image.
Figure 8:
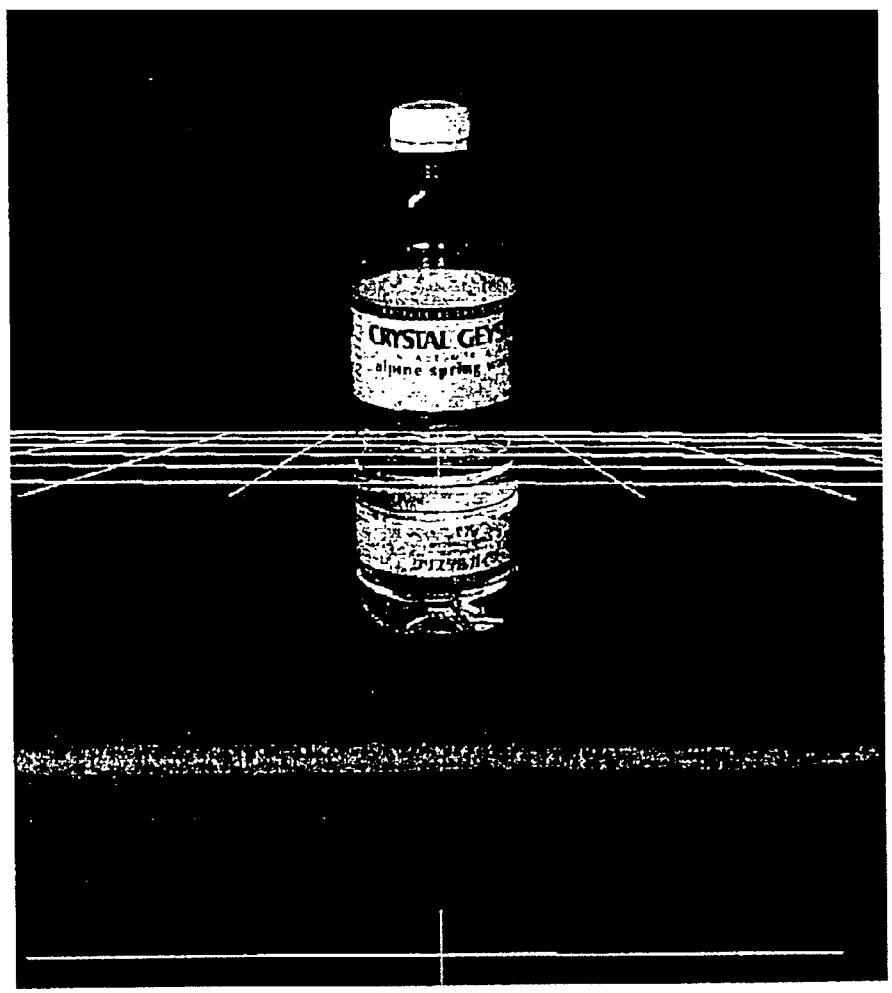
FIG. 8 is a corresponding actual image.

Unlike the conventional mask data, which is binary two levels, the transparency image PT obtained by the transparent calculation processing part AT has transparency that is finely classified and is numerical more than two levels for each pixel, so that changes between pixels are smooth. In addition, each pixel of a mirror part on which the background is reflected has a value between transparent and opaque, the object O is smoothly overlaid on the background image PZ as shown in the overlaid image AS of FIG. 4, wherein the mirror reflection part is present. On the other hand, the image shown in FIG. 3 that is obtained by the conventional way seems unnatural. FIG. 5 and FIG. 6 are actual images corresponding to FIG. 3 and FIG. 4 respectively. In addition, as shown in FIG. 7 and FIG. 8 that is the actual image, even when the object O is transparent or semi-transparent, the object O can be overlaid on the background image while keeping natural transparency or natural semi-transparency.

In the following, each function of the processing parts shown in FIG. 1 will be described.

Figure 9:
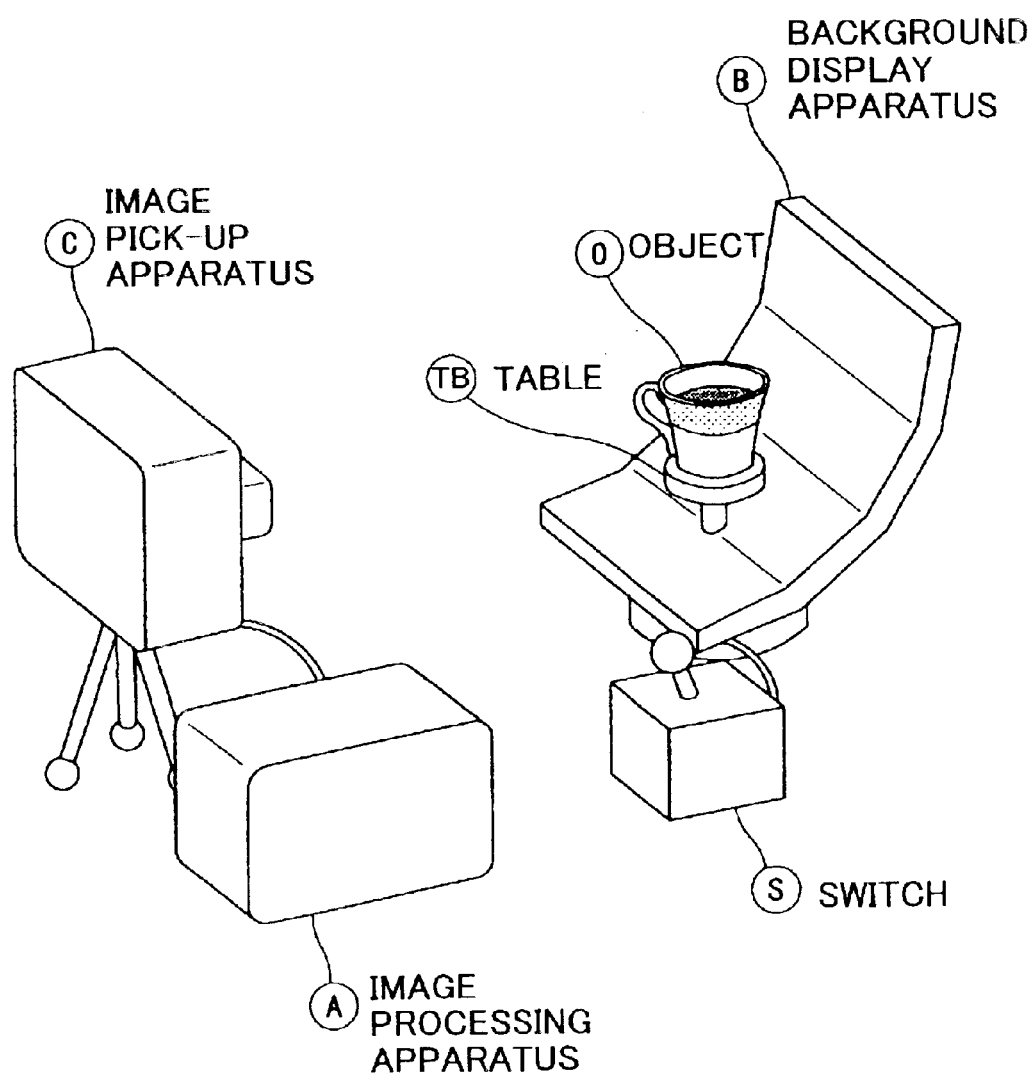
FIG. 9 shows an image-capturing system for obtaining images according to the embodiment of the present invention.

FIG. 9 shows the image-capturing system SP for obtaining the images P1 and P2. The image-capturing system SP includes a background display apparatus B, a table TB, and a camera C. The background display apparatus B changes color and/or brightness of the background by using an electrical signal changed by the switch S. The camera C picks up an image of the object O, the background display apparatus B and the table TB. The object O is put on the table TB, a value of the electrical signal is selected between two values by the switch S. Accordingly, the images P1 and P2 in which the backgrounds are different can be obtained by the camera C. The camera C can be moved, so that the images of the object O can be taken from many directions.

As the background display apparatus B, an EL panel, a liquid crystal panel, a liquid crystal shutter, a projector type screen, a plasma display, a CRT and the like can be used. It is desirable to use a transparent material for the table TB such that the background can be seen through the table TB.

For each of the images P1 and P2, assuming that the horizontal number of the pixels is W, the vertical number of the pixels is H, and pixel values of P1 and P2 are P1(x, y) and P2(x, y) ($0 \leq x < W$, $0 \leq y < H$) respectively, the transparency calculation processing part AT obtains the maximum value PPMAX in $|P1(x, y)-P2(x, y)|$ for all pixels. The pixel value may be a RGB value, a brightness value or the like. For the transparency calculation, it is desirable to use a pixel value by which the difference between P1(x, y) and P2(x, y) becomes large.

A value PT(x, y) of a point in the transparency image PT generated by the transparency calculation processing part AT is calculated by an equation $1-|(P1(x,y)-P2(x,y))/PPMAX|$, wherein 0 indicates transparent, 1 indicates opaque, and the transparency is represented by a real number between 0 and 1. The transparency calculation processing part AT obtains the transparency image PT by calculating the value for each pixel by using the equation. For example, the maximum pixel change PPMAX can be obtained by PPB1-PPB2, in which PPB1 is a pixel value of a part where the object is not included in the image P1, and PPB2 is a corresponding pixel value of the part where the object is not included in the image P2. Or, PPMAX may be the maximum value in $|P1(x, y)-P2(x, y)|$ for all pixels.

The background display apparatus B shown in FIG. 9 has a curved surface such that the image of the object can be taken from many directions, for example, from the side, from the obliquely upper side and from the upper side. By taking images of the object from many directions, a three-dimensional image of the object can be obtained. When the brightness is different between an upper part and a lower part of the background of the image, the transparency cannot be obtained accurately by the above-mentioned method for obtaining PPMAX. This problem can be solved by obtaining the transparency for each horizontal line by using a property that the object is not included in the edges of the image so that the pixel of the edge is completely transparent. That is, PPMAX is obtained for each line. For example, when the object is not included in the left side edge of the image, the transparency image can be obtained, by the following equation, $PT(x,y)=1-|(P1(x,y)-P2(x,y))/(P1(0,y)-P2(0,y))|$.

That is, the maximum pixel change PPMAX is obtained by PE1-PE2 in which PE1 and PE2 are pixel values of an end of a horizontal line of the images P1 and P2 respectively.

In addition, by using background images that do not include any object, the transparency can be calculated more accurately. According to this method, the images P1 and P2, and images PB1 and PB2 are used, in which the object is included and the backgrounds are different as for the image P1 and P2, and, as for the PB1 and PB2, the object is not included, and the backgrounds are the same as those of the images P1 and P2. In this case, the transparency can be obtained by the following equation, $PT(x,y)=1-|(P1(x,y)-P2(x,y))/(PB1(x,y)-PB2(x,y))|$.

The transparency image PT may include noise due to an environmental condition of the image-capturing system, and the overlaid image may become bad-looking. In such a case, the noise can be removed by applying the noise filter AN such as a median filter and the like on the whole of the transparency image PT. The image generated in this way is referred to as PTA.

Next, the color calculation processing part AC may simply output the image P1 or the image P2. Or, the color calculation processing part AC may calculate mean color between the images P1 and P2 so that the effect by surrounding light can be averaged. In addition, by removing the color of the background that is seen through the object by using the result of the processing of the transparency calculation processing part AT, the color intrinsic for the object can be extracted.

The lighting condition for taking the image of the object is important for overlaying the object on the background image clearly with high quality. If the intensity of the light illuminating the object is high, the color image becomes clear. However, in this case, it becomes difficult to detect the change of the background even when the color and/or brightness of the background is changed in the above-mentioned way. Thus, the transparency image can not be obtained accurately. For solving this problem, first, the transparency image is obtained by using the images in which the object is not specially illuminated and the background is changed, then, the image of the object is taken by specially illuminating the object so as to use this image as the color image. As a result, the overlaid image can be obtained more clearly and with higher quality.

In addition, images of the object O are taken under a plurality of lighting conditions, and the overlaid image is generated by using an image of the object O taken under a lighting condition similar to that under which the background image is taken. As a result, an overlaid image that matches the background can be generated.

The cutting processing part AR uses the transparency image PT when the noise filter AN is not used, and uses the transparency image PTA when the noise filter AN is applied. The cutting processing part AR obtains rectangular enclosing pixels, each of which has a transparency greater than a threshold TH (0<TH<1), and cuts out an image of rectangular shape for each of the transparency image PT or PTA and the color image PC. Accordingly, the transparency image PTS and the color image PCS having smaller image size are obtained. Accordingly, the amount of the image information of the object can be decreased.

The overlaying processing part AS receives the transparency image PTS, the color image PCS, and the background image PZ that is separate from the background of the image including the object, and obtains the overlaid image PS in which the object O is overlaid on the background image PZ. The process of overlaying can be performed by the following equation.

$$PS(x,y)=PT(x,y) \times PC(x,y)+(1-PT(x,y)) \times PZ(x,y)$$

This equation is generally used for blending by using the ratio of the transparency.

Figure 10:
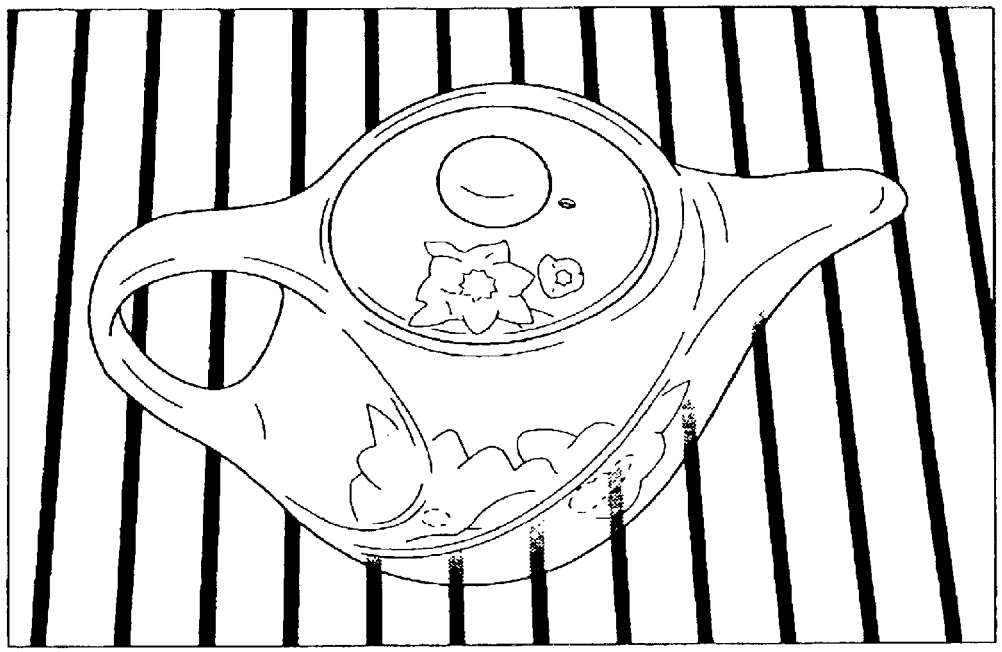
FIG. 10 shows an example image in which an object is overlaid on a background image without blurring the background image according to an embodiment of the present invention.

However, when there is a pattern such as a line and the like where the color changes abruptly in the background, there is a problem that the pattern is seen through the overlaid object O. As shown in the example shown in FIG. 4, in which the object is overlaid by using the method of the present invention, the white line in the background image may be seen through the surface of the overlaid telephone. If the amount of the pattern that is shown on the surface of the object is small, it is inconspicuous. However, as shown in FIG. 10, in an example in which the pot is overlaid on a background having lines, the bottom of the pot seems to be transparent and the pot seems unrealistic. This problem can be solved by blurring away a part of the background corresponding to the position of the object, then, overlaying the object on the blurred background. The blurring is performed such that, the smaller the transparency PT is, the greater the amount of blurring is. The blurring is performed by the following equation:

$$PS(x, y) = PC(x, y) \times PT(x, y) + (1 - PT(x, y)) \times \frac{1}{(k+1)^2} \sum_{m=-\frac{k}{2}}^{m=\frac{k}{2}} \sum_{n=-\frac{k}{2}}^{n=\frac{k}{2}} PZ(x+m, y+n)$$

Figure 11:
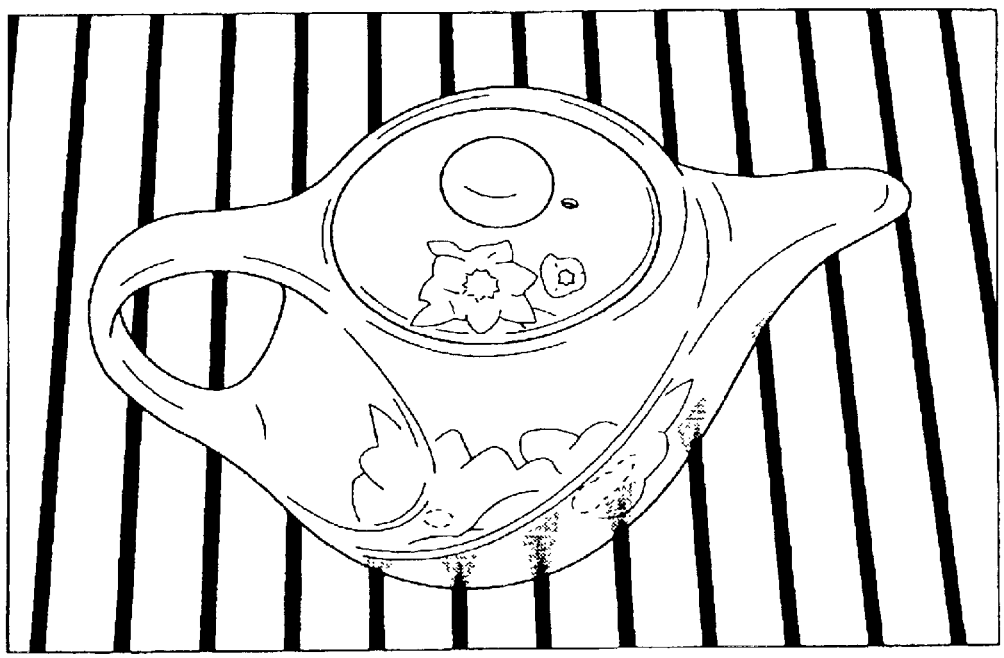
FIG. 11 shows an example image in which an object is overlaid on a background image by blurring the background image according to an embodiment of the present invention.
Figure 12:
FIG. 12 shows another example image in which an object is overlaid on a background image by blurring the background image according to an embodiment of the present invention.

$k = K \times PT(x,y)$ wherein K is a constant. FIG. 11 shows an example in which the overlaying process is performed by using this equation. As shown in this image, since the lines in the background corresponding to the pot are blurred, the pot is not seen as transparent. In addition, as shown in FIG. 12, by blurring the background image of a transparent object in the above-mentioned way, the background image seems to be refracted through the transparent object, so that an realistic image can be obtained.

In the above-mentioned overlaying method, the overlaid image PS may be obtained by applying a filter F on the image PZ, in which the filter F can change the amount of blurring according to the value of the transparency image PT. As the filter F, a moving average filter or a median filter can be used in which the size of the matrix is changed according to the transparency image PT.

Although two images having different backgrounds are used in the above-mentioned embodiment, by using more than two images each of which has a different background, the transparency and the color image can be obtained more accurately. For example, the overlaid image can be obtained by calculating the transparency image and the color image for each combination of two images selected from a plurality of images, and by calculating a mean value of the combinations. In addition, the method of least squares and the like may be used.

In addition, an example in which the object is overlaid on a two-dimensional image is explained in the above-mentioned embodiment, the object can be displayed as a three-dimensional image by using images that are taken from many directions.

Figure 13:
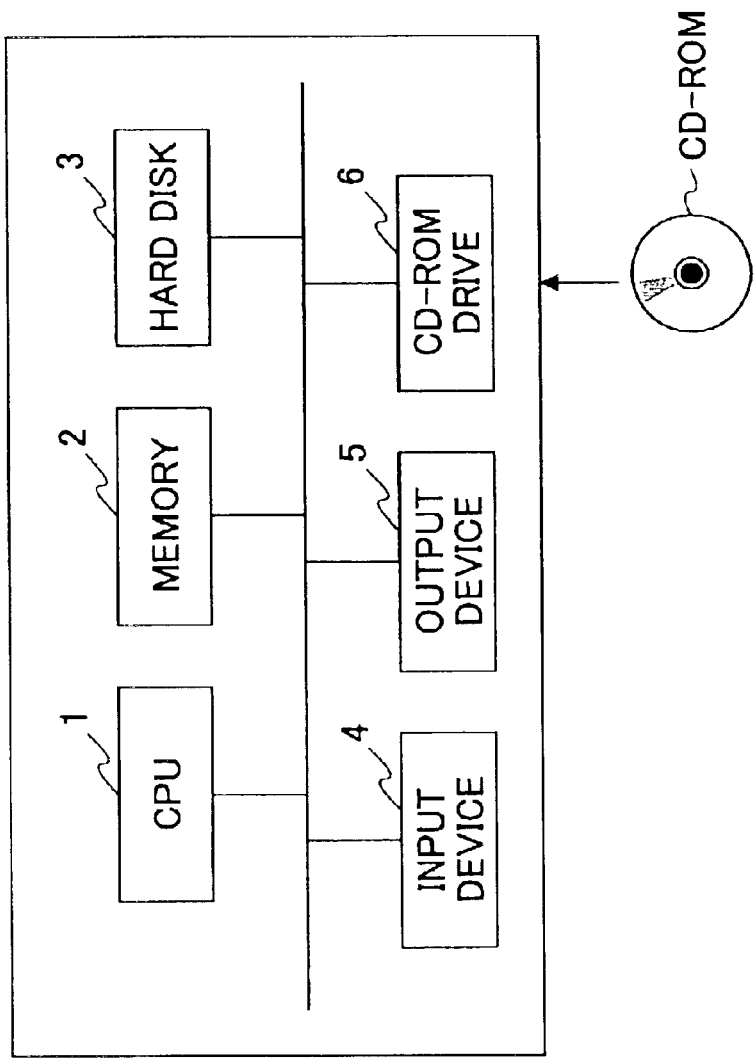
FIG. 13 shows a configuration of a computer that can be used as the image processing apparatus of the present invention.

A part or all of the functions in the image processing apparatus shown in FIG. 1 can be realized by a computer program. The present invention can be realized by executing the program by using a computer shown in FIG. 13 for example. The computer shown in FIG. 13 includes a CPU 1, a memory 2, a hard disk 3, an input device 4, an output device 5 and a CD-ROM drive 6.

Or, the steps 2–7 and details of each step shown in FIG. 2 can be realized by a computer program, and the program can be executed by the computer. In addition, the program can be recorded in a computer readable medium such as FD (floppy disk), a MO, a ROM, a memory card, a CD-ROM, a DVD and a removable disk, and can be preserved, and can be distributed. In addition, the program can be provided via a network by using the Internet, e-mail and the like.

As mentioned above, according to the present invention, even though the object is transparent or semi-transparent, or the surface of the object is reflective, a part of the cut out image of the object does not unnaturally disappear. Thus, the background and the object can be separated accurately, so that when the object is overlaid on another image, transparency or semi-transparency and reflection can be reproduced and a natural image can be obtained.

The present invention is not limited to the specifically disclosed embodiments, and variations and modifications may be made without departing from the scope of the present invention

What is claimed is:

1. An image processing method used for an image processing apparatus to overlay an image of an object to another image, said method comprising:

a step of receiving n images each of which includes said object, wherein n is an integer no less than two, and either or both of color and brightness are different for each of the n images;

a transparency calculation step of obtaining, from said n images, a transparency image having a transparency value for each pixel;

a color calculation step of obtaining a color image of said object from said n images; and an overlaying step of overlaying said object on said another image by using said transparency image and said color image, wherein a pixel value of an overlaid image is obtained by $$PS(x, y) = PC(x, y) \times PT(x, y) + (1 - PT(x, y)) \times \frac{1}{(k+1)^2} \sum_{m=-\frac{k}{2}}^{m=\frac{k}{2}} \sum_{n=-\frac{k}{2}}^{n=\frac{k}{2}} PZ(x+m, y+n)$$

and $k = K \times PT(x, y)$, wherein PT(x, y) is a pixel value of said transparency image, PC(x, y) is a pixel value of said color image, and PZ(x, y) is a pixel value of said another image.

2. The image processing method as claimed in claim 1, wherein transparency AP (x, y) of each pixel of said transparency image is obtained by an equation 1−|(P1(x,y)−P2(x,y))/PPMAX|, wherein PPMAX is PPB1−PPB2, P1(x, y) is a pixel value of a first image in said n images, P2(x, y) is a pixel value of a second image in said n images, PPB1 is a pixel value of a pixel in a part other than the object in said first image, PPB2 is a pixel value of a pixel in said second image corresponding to said pixel in said first image.

3. The image processing method as claimed in claim 2, wherein PPMAX is the greatest value in absolute values of P1(x, y)−P2(x, y) for every pixel.

4. The image processing method as claimed in claim 2, wherein PPMAX is calculated for each line in said first image and said second image.

5. The image processing method as claimed in claim 4, wherein PPMAX is calculated as PE1−PE2, wherein PE1 is a pixel value of a pixel of an end of said line in said first image and PE2 is a pixel value of a pixel in said second image corresponding to said pixel of said end of said line.

6. The image processing method as claimed in claim 2, wherein said first image and said second image are a combination selected from said n images, and said transparency AP(x, y) is calculated as a mean value of transparencies for every combination in said n images.

7. The image processing method as claimed in claim 1, wherein transparency AP (x, y) of each pixel of said transparency image is obtained by an equation 1−|(P1(x,y)−P2(x,y))/(PB1(x,y)−PB2(x,y))|, wherein P1(x, y) is a pixel value of a first image in said n images, P2(x, y) is a pixel value of a second image in said n images, PB1(x, y) is a pixel value of a pixel (x, y) in a first background image that does not include said object and the background of said first background image is the same as the background of said first image, PB2(x, y) is a pixel value of a pixel (x, y) in a second background image that does not include said object and the background of said second background image is the same as the background of said second image.

8. The image processing method as claimed in claim 1, wherein said color image is one of said n images.

9. The image processing method as claimed in claim 1, wherein each pixel value of said color image is a mean value of pixel values of pixels in the same position in said n images.

10. The image processing method as claimed in claim 1, wherein influence of color of the background is removed from said color image by using said transparency image.

11. The image processing method as claimed in claim 1, wherein a first rectangular image enclosing said object is cut out from said transparency image, and a second rectangular image enclosing said object is cut out from said color image.

12. The image processing method as claimed in claim 11, wherein said first rectangular image includes pixels each of which has a transparency greater than a threshold, and the size and the position of said second rectangular image are the same as the size and the position of said first rectangular image.

13. The image processing method as claimed in claim 1, said image processing method further comprising a noise removing step of applying a noise removing filter to said transparency image.

14. The image processing method as claimed in claim 1, wherein said overlaid image is obtained after said another image is filtered by a filter by which blurring amount is changed according to a pixel value of said transparency image.

15. The image processing method as claimed in claim 14, wherein said filter is a moving average filter or a median filter in which the size of a matrix is changed according to a pixel value of said transparency image.

16. The image processing method as claimed in claim 1, wherein said object is overlaid on said another image by using an object color image, instead of said color image, that is taken separately from said n images.

17. The image processing method as claimed in claim 16, wherein said object color image is an image selected from object color images each of which is taken under a different lighting condition, and the lighting condition for said object color image that is selected is the closest to the lighting condition under which said another image is taken.

18. An image processing apparatus for overlaying an image of an object on another image, said image processing apparatus comprising:

a part for receiving n images each of which includes said object, wherein n is an integer no less than two, and either or both of color and brightness are different for each of the n images;

a part for obtaining, from said n images, a transparency image having a transparency value for each pixel;

a part for obtaining a color image of said object from said n images; and a part for overlaying said object on said another image by using said transparency image and said color image, wherein a pixel value of an overlaid image is obtained by $$PS(x, y) = PC(x, y) \times PT(x, y) + (1 - PT(x, y)) \times \frac{1}{(k+1)^2} \sum_{m=-\frac{k}{2}}^{m=\frac{k}{2}} \sum_{n=-\frac{k}{2}}^{n=\frac{k}{2}} PZ(x + m, y + n)$$

and k=K×PT(x, y), wherein PT(x, y) is a pixel value of said transparency image, PC(x, y) is a pixel value of said color image, and PZ(x, y) is a pixel value of said another image.

19. The image processing apparatus as claimed in claim 18, wherein said n images are taken by using an image capturing system, said image capturing system comprising:

a background display apparatus for displaying a background that changes either or both of color and brightness by using an electronic signal;

a table on which the object is placed, wherein either or both of color and brightness of said table changes in the same way as said background display apparatus;

an image pick-up apparatus for taking an image of said background display apparatus, said object and said table.

20. The image processing apparatus as claimed in claim 18, said image processing apparatus further comprising a noise removing filter for removing noise from said transparency image.

21. A computer readable medium storing program code for causing a computer to overlay an image of an object on another image, said computer readable medium comprising:

program code means for receiving n images each of which includes said object, wherein n is an integer no less than two, and either or both of color and brightness are different for each of the n images;

transparency calculation program code means for obtaining, from said n images, a transparency image having a transparency value for each pixel;

color calculation program code means for obtaining a color image of said object from said n images; and overlaying program code means for overlaying said object on said another image by using said transparency image and said color image, wherein, in said overlaying program code means, a pixel value of an overlaid image is obtained by $$PS(x, y) = PC(x, y) \times PT(x, y) + (1 - PT(x, y)) \times \frac{1}{(k+1)^2} \sum_{m=-\frac{k}{2}}^{m=\frac{k}{2}} \sum_{n=-\frac{k}{2}}^{n=\frac{k}{2}} PZ(x+m, y+n)$$

and k=K×PT(x, y), wherein PT(x, y) is a pixel value of said transparency image, PC(x, y) is a pixel value of said color image, and PZ(x, y) is a pixel value of said another image.

22. The computer readable medium as claimed in claim 21, wherein, in said transparency calculation program code means, transparency AP (x, y) of each pixel of said transparency image is obtained by an equation 1−|(P1(x,y)−P2(x,y))/PPMAX|, wherein PPMAX is PPB1−PPB2, P1(x, y) is a pixel value of a first image in said n images, P2(x, y) is a pixel value of a second image in said n images, PPB1 is a pixel value of a pixel in a part other than the object in said first image, and PPB2 is a pixel value of a pixel in said second image corresponding to said pixel in said first image.

23. The computer readable medium as claimed in claim 22, wherein PPMAX is the greatest value in absolute values of P1(x, y)−P2(x, y) for every pixel.

24. The computer readable medium as claimed in claim 22, wherein PPMAX is calculated for each line in said first image and said second image.

25. The computer readable medium as claimed in claim 24, wherein PPMAX is calculated as PE1−PE2, wherein PE1 is a pixel value of a pixel of an end of said line in said first image and PE2 is a pixel value of a pixel in said second image corresponding to said pixel of said end of said line.

26. The computer readable medium as claimed in claim 22, wherein said first image and said second image are a combination selected from said n images, and said transparency AP(x, y) is calculated as a mean value of transparencies for every combination in said n images.

27. The computer readable medium as claimed in claim 21, wherein, in said transparency calculation program code means, transparency AP (x, y) of each pixel of said transparency image is obtained by an equation 1−|(P1(x,y)−P2(x,y))/(PB1(x,y)−PB2(x,y))|, wherein P1(x, y) is a pixel value of a first image in said n images, P2(x, y) is a pixel value of a second image in said n images, PB1(x, y) is a pixel value of a pixel (x, y) in a first background image that does not include said object and the background of said first background image is the same as the background of said first image, PB2(x, y) is a pixel value of a pixel (x, y) in a second background image that does not include said object and the background of said second background image is the same as the background of said second image.

28. The computer readable medium as claimed in claim 21, wherein, in said color calculation program code means, said color image is one of said n images.

29. The computer readable medium as claimed in claim 21, wherein, in said color calculation program code means, each pixel value of said color image is a mean value of pixel values of pixels in the same position in said n images.

30. The computer readable medium as claimed in claim 21, wherein, in said color calculation program code means, influence of color of the background is removed from said color image by using said transparency image.

31. The computer readable medium as claimed in claim 21, said computer readable medium further comprising:
program code means for cutting out a first rectangular image enclosing said object from said transparency image, and cutting out a second rectangular image enclosing said object from said color image.

32. The computer readable medium as claimed in claim 31, wherein said first rectangular image includes pixels each of which has a transparency greater than a threshold, and the size and the position of said second rectangular image are the same as the size and the position of said first rectangular image.

33. The computer readable medium as claimed in claim 21, said computer readable medium further comprising noise removing program code means for applying a noise removing filter to said transparency image.

34. The computer readable medium as claimed in claim 21, wherein, in said overlaying program code means, said overlaid image is obtained after said another image is filtered by a filter by which blurring amount is changed according to a pixel value of said transparency image.

35. The computer readable medium as claimed in claim 34, wherein said filter is a moving average filter or a median filter in which a size of the matrix is changed according to a pixel value of said transparency image.

36. The computer readable medium as claimed in claim 21, wherein, in said overlaying program code means, said object is overlaid on said another image by using an object color image, instead of said color image, that is taken separately from said n images.

37. The computer readable medium as claimed in claim 36, wherein, in said overlaying program code means, said object color image is an image selected from object color images each of which is taken under a different lighting condition, and the lighting condition for said object color image that is selected is the closest to the lighting condition under which said another image is taken.

38. A computer program for causing a computer to overlay an image of an object on another image, said computer program comprising:
program code means for receiving n images each of which includes said object, wherein n is an integer no less than two, and either or both of color and brightness are different for each of the n images;
transparency calculation program code means for obtaining, from said n images, a transparency image having a transparency value for each pixel;
color calculation program code means for obtaining a color image of said object from said n images; and
overlaying program code means for overlaying said object on said another image by using said transparency image and said color image,
wherein, in said overlaying program code means, a pixel value of an overlaid image is obtained by $$PS(x, y) = PC(x, y) \times PT(x, y) + (1 - PT(x, y)) \times \frac{1}{(k+1)^2} \sum_{m=-\frac{k}{2}}^{m=\frac{k}{2}} \sum_{n=-\frac{k}{2}}^{n=\frac{k}{2}} PZ(x+m, y+n)$$

and k=K×PT(x, y), wherein PT(x, y) is a pixel value of said transparency image, PC(x, y) is a pixel value of said color image, and PZ(x, y) is a pixel value of said another image.

* * * * *